P. E. FOX.
Evaporating-Pan.

No. 165,223.  Patented July 6, 1875.

Attest:
A. W. Fiske
M. P. Harwood.

Perley E. Fox   Inventor:

UNITED STATES PATENT OFFICE.

PERLEY E. FOX, OF MARLOW, NEW HAMPSHIRE.

IMPROVEMENT IN EVAPORATING-PANS.

Specification forming part of Letters Patent No. 165,223, dated July 6, 1875; application filed May 24, 1875.

*To all whom it may concern:*

Be it known that I, PERLEY E. FOX, of Marlow, in the county of Cheshire and State of New Hampshire, have invented certain new and useful Improvements in Evaporating-Pans; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates especially to that class of evaporators used in manufacturing sugar and sirup from the sap of the maple and juice of the sorghum, in which its use is confined to a few weeks in each year, although it may be used for other purposes, if desired, the object being to produce a pan of good width and of any desired length, which may be easily taken to pieces when not in use and packed away, thus saving it from injury by rust or accidents until its services are again required, when the several parts are connected, the pan placed in position, and it is ready for another season of work; and the invention consists in the construction and arrangement of the different parts of the pan, as will be hereinafter fully described, and then pointed out in the claim.

Figure 1:
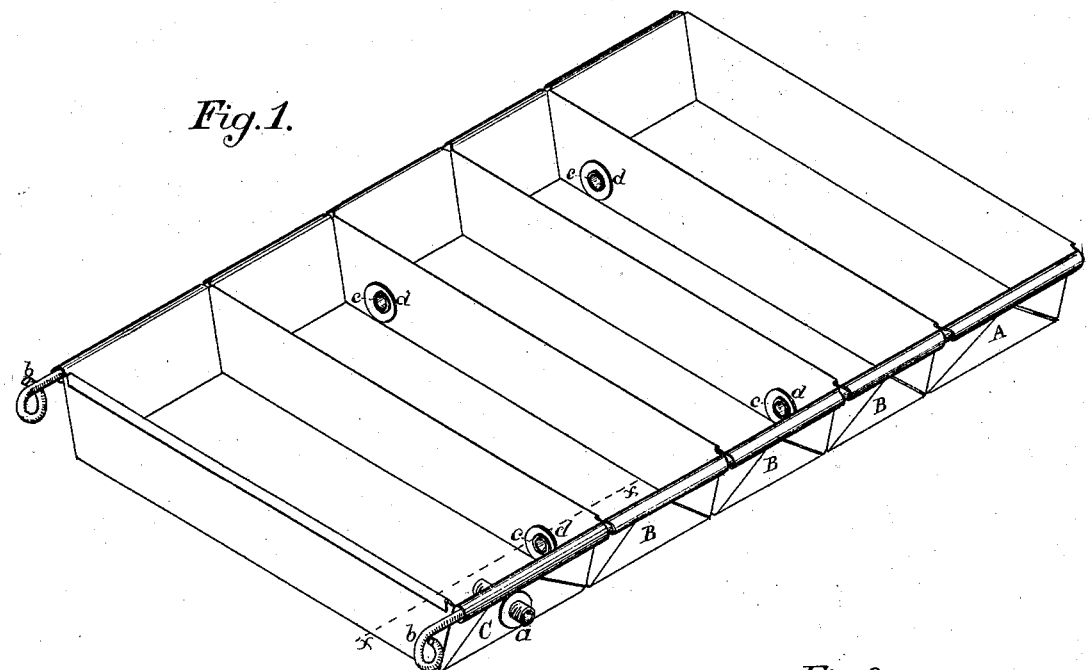
Figure 2:
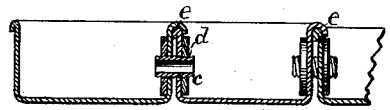
Figure 3:
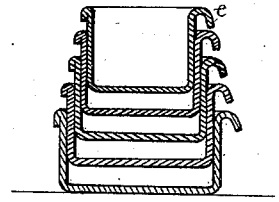
Figure 4:

Figure 1 represents a perspective view of a series of the pans united, and with the tubular connections between the different sections in place. Fig. 2 is a longitudinal section through a part of the series, on the line *x x*, showing the method of inserting the tubular connections, and the connecting-lap which covers the junction of each two pans. Fig. 3 is a section through a pile of these pans, showing the method of packing; and Fig. 4 shows one of the tubular connections.

A represents the first of a series of pans, into which the fluid to be evaporated is first allowed to flow. B B B are intermediate pans, in number corresponding with the length it is desired to give the whole, C being the end of the series, and having the outlet-pipe *a* inserted in one of its ends, for the purpose of drawing off the concentrated contents when desired. These pans are connected to each other, so as to form a single evaporating device, resting upon the walls of the arch, all over the same furnace, by means of two rods, *b b*, which are passed through a convolution of the material composing the pans at each end, and by tubular connections *c c*, &c., which are formed of a tube having a screw-thread cut upon its outer surface, and provided with two nuts, *d*, one of which screws upon each end of the tube, and which may be rendered perfectly tight by facing the nuts or interposing a washer of cotton cloth between them and the sides of the pan, as when the liquid is introduced into the pan this washer absorbs it and swells, so as to completely prevent all leakage. Orifices for the reception of these tubes are made in the sides of the pans alternately at opposite ends, so that when a series of them are connected to each other, the liquid being evaporated shall flow through them from end to end in its progress from pan A to pan C. The pans have flaring ends and nearly vertical sides, one of which is left straight and the other bent over, so as to form a lap, *e*, covering the junction of the two, as shown in the section in Fig. 2. The pans are also preferably made of varying widths, so that when they are disengaged from each other by the withdrawal of the rods *b b* and tubular connections *c*, the whole series may be packed one within the other, as shown in Fig. 3, thus forming a pan which may be easily packed for transportation, or, when not in use, stored without occupying much space.

I am aware that evaporators have been constructed in sections united by wooden sides, and having openings between the sections for the passage of the fluid to be evaporated; but such a method of construction I do not claim.

Having thus described my invention, I claim as new, and desire to secure by Letters Patent, the following:

An evaporating-pan composed of a series of narrow pans connected together by means of the rods *b b*, tubular connections *c d*, and lap *e*, substantially as and for the purpose described.

In testimony that I claim the foregoing as my own I hereunto affix my signature in presence of two witnesses.

PERLEY E. FOX.

Witnesses:
JOHN Q. JONES,
LYMAN CRAM.